United States Patent [19]

Camacho et al.

[11] Patent Number: 5,106,129
[45] Date of Patent: Apr. 21, 1992

[54] FLEXIBLE COUPLING FOR TRANSFERRING A FLUID BETWEEN TWO FLUID CONDUITS

[75] Inventors: Luis A. Camacho, Lake Zurich, Ill.; David A. Jackson, LaGrange, Ky.; Donald F. York, Greenville, Ind.

[73] Assignee: Delaware Capital Formation, Inc., Wilmington, Del.

[21] Appl. No.: 594,051

[22] Filed: Oct. 9, 1990

[51] Int. Cl.$^5$ .............................................. F16L 55/00
[52] U.S. Cl. ................................ 285/233; 277/165; 285/231
[58] Field of Search ............... 285/231, 233, 234, 223, 285/910, 918, 917; 277/141, 165

[56] References Cited

U.S. PATENT DOCUMENTS

| | | | |
|---|---|---|---|
| 3,860,250 | 1/1975 | Lundquist | 277/165 |
| 3,999,767 | 12/1976 | Sievenpiper | 277/165 |
| 4,109,924 | 8/1978 | Stucke | 277/165 |
| 4,190,259 | 2/1980 | Zitting | 277/165 |
| 4,216,981 | 8/1980 | Jensen | 285/231 |
| 4,738,476 | 4/1988 | Peaster | 285/233 |
| 4,767,123 | 8/1988 | Kiese | 277/141 |

FOREIGN PATENT DOCUMENTS 2327159 12/1974 Fed. Rep. of Germany ...... 285/231
899964 6/1962 United Kingdom ................ 285/231

Primary Examiner—Eric K. Nicholson
Attorney, Agent, or Firm—Maurice L. Miller, Jr.

[57] ABSTRACT

A flexible coupling for transferring a fluid between two fluid conduits and for providing an effective fluid seal is disclosed. The device includes a body portion containing a hollow interior open on opposite ends thereof and having a raised cylindrically shaped end collar formed around at least one of the open ends. The end collar defines an outwardly opening, endlessly extending groove in which a seal ring assembly is removably disposed and which projects out of the groove to provide an effective fluid seal against a cylindrically shaped bearing surface of a hollow conduit collar, the latter being attachable to one of the fluid conduits. A pair of stop members disposed in the conduit collar confines the end collar for both rotatable and translatable sliding movement therebetween. The body portion is also angularly adjustable relative to a centerline of the hollow interior of the conduit collar. Various removable seal ring and biasing spring configurations for use in the end collars are also disclosed.

35 Claims, 2 Drawing Sheets

FLEXIBLE COUPLING FOR TRANSFERRING A FLUID BETWEEN TWO FLUID CONDUITS

BACKGROUND OF THE INVENTION

This invention relates to a fluid coupling device which joins and provides an effective seal between upstream and downstream conduits, which device is flexible in that it permits angular misalignment, axial movement and rotation of a body portion of the device relative to the adjoining conduits.

Such devices, broadly speaking, are old and well known in the prior art. See, for example, the sealing apparatus disclosed in U.S. Pat. No. 4,054,306 issued to B. J. Sadoff, Jr. et al. on Oct. 18, 1977. In one disclosed example, the reference apparatus includes an end ring portion joined to a frustoconical tapered portion, which is, in turn, joined to a frustoconical short portion, joined in turn to a cylindrical portion. Each of these portions are hollow and are integrally joined to one another and, in addition, the cylindrical portion is welded to the end of a first fluid conduit. The end ring portion, tapered portion and short portion fit within a bore in a body member, which bore forms an adjoining second fluid conduit. The ring portion is crowned in that its periphery is convex and arcuate in longitudinal cross-section and is slightly oversized compared to the diameter of the bore so as to be spring loaded against and around the bore defining wall to form a fluid seal. The reference apparatus is capable of angular misalignment relative to the longitudinal centerline of the bore as well as capable of longitudinal and rotational sliding movement within the bore while providing a fluid path between the first and second conduits.

A difficulty that has been encountered using this type of prior art coupling is that, over relative short time periods, due to vibraton and rubbing movement of the ring portion against the bore wall, the crown of the ring portion begins to wear thus resulting in fluid leakage between the crown and bore wall interface. Consequently the single ring portion of the reference assembly does not provide an effective fluid seal over a long duration, even when the assembly is used in a relatively low pressure fluid environment. Moreover, because the end ring portion of the reference device is integral with the other component parts thereof, the end ring portion can not be replaced without replacing the entire device. Consequently, the entire device must be discarded when the end ring portion sustains excessive wear which, unfortunately, occurs in relatively short order as previously indicated.

By means of the present invention, these and other difficulties encountered with prior art flexible couplings for transferring fluids between conduits and for providing an effective fluid seal therebetween is substantially overcome.

SUMMARY OF THE INVENTION

It is an object of my invention to provide an improved flexible coupling for transferring a fluid, under pressure, between a pair of fluid conduits while permitting angular misalignment, axial movement and rotation of a body member of the coupling relative to at least one of the conduits.

It is another object of my invention to provide an improved flexible coupling which employs replaceable sealing rings for increasing the useful life of the remaining portions of the coupling.

It is yet another object of my invention to provide an improved flexible coupling for transferring a fluid, under pressure, between a pair of fluid conduits while permitting angular misalignment, axial movement and rotation of a body member of said coupling relative to both of the fluid conduits.

Briefly, in accordance with the present invention, there is provided an improved flexible coupling for transferring a fluid, under pressure, from a first to a second fluid conduit. The coupling includes a hollow body member open on opposite ends thereof. A first cylindrically shaped end collar is also included which is rigidly secured to the member around at least one of its open ends. The first end collar defines an outwardly opening groove which extends endlessly around a peripheral surface portion thereof. A first conduit collar is also included which defines a hollow cylindrically shaped interior open on opposite ends thereof. The first conduit collar is disposed over and around the first end collar. A first seal ring means is removably disposed in the groove and extends radially outward therefrom for providing an effective fluid seal between the first end collar and the hollow interior defining surface of the first conduit collar. A first pair of stop means is attached to opposite end portions of the hollow interior defining surface of the first conduit collar for confining the first end collar therebetween. A first biasing means is disposed in the groove inwardly of the seal ring means for urging the seal rings outwardly against the hollow interior defining surface of the first conduit collar, the first end collar being slidably rotatable in the first conduit collar and slidably movable between the pair of stop means, the body member being angularly adjustable relative to a centerline of the first conduit collar.

These and other objects, features and advantages of the present invention will become apparent to those skilled in the art from the following detailed description and attached drawings upon which, by way of example, only a preferred embodiment of my invention is explained and illustrated.

DESCRIPTION OF THE PREFERRED EMBODIMENT

Figure 1:
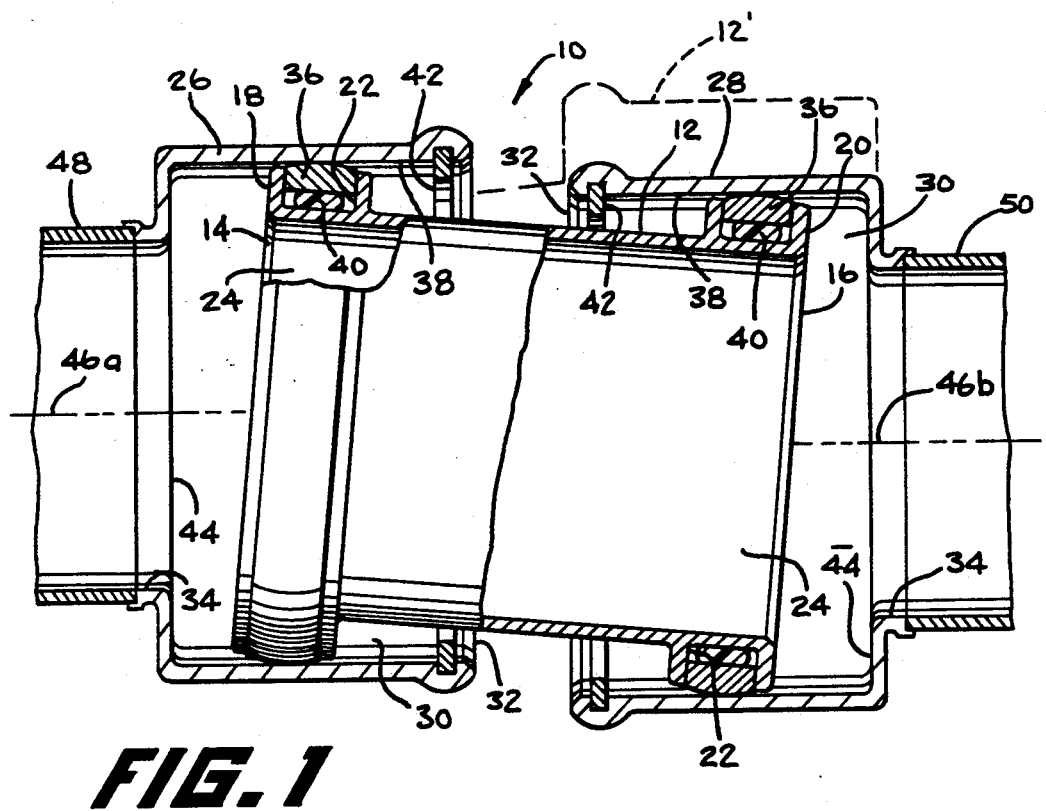
FIG. 1 shows a longitudinal partially cross-sectioned view of a generally cylindrically shaped flexible coupling for transferring a fluid between two attached fluid conduits, thus illustrating one preferred embodiment of our invention.

Referring now to the drawing figures and specifically to FIG. 1, there is shown, in one preferred embodiment of my invention, a flexible coupling 10 which includes a hollow body member 12 having openings 14 and 16 on opposite ends thereof and a pair of raised cylindrically shaped end collars 18 and 20 rigidly secured to the member 12 around the open ends 14 and 16, respectively. The end collars 18 and 20 are identical in construction and each defines an outwardly opening groove 22 which extends endlessly around a peripheral surface portion thereof. In the present example, the body member 12 is cylindrically shaped and contains a hollow cylindrically shaped interior 24 and the end collars 18 and 20 are integrally formed on the member 12.

The coupling 10 also includes a pair of conduit collars 26 and 28 which are identical in construction, each of which defines a hollow cylindrically shaped interior 30 and circular openings 32 and 34 on inner and outer ends thereof, respectively. The conduit collars 26 and 28 are removably disposed over and around the end collars 18 and 20, respectively. The end collar grooves 22 each contain seal ring means which, in the present example, include an endless seal ring 36 constructed of a suitably durable or relatively non-wearable, compressible resilient material such as that sold under the trademark TEFLON, a surface portion of which extends radially out of each groove 22 so as to bear against hollow interior defining surfaces 38 of the conduit collars 26 and 28. The end collar grooves 22 each contain biasing means which includes an endless biasing ring 40 constructed of a suitably compressible, resilient material such as that sold under the trademark VITON. When the coupling 10 is in an assembled state as shown in FIG. 1, the seal rings 36 and biasing rings 40 are held in compression between the surfaces 38 of the conduit collars 26 and 28 and bases of the grooves 22 such that the biasing rings 40 apply a reaction force against the corresponding seal rings 36 for urging the latter outwardly against the surfaces 38 to provide an effectively fluid tight seal between the surfaces 38 and the end collars 18 and 20.

The coupling 10 also includes a pair of stop means 42 and 44 attached to opposite end portions of each of the conduit collars 26 and 28. The stop means 42 is a conventional split retaining ring removably disposed in a groove formed in and around the surface 38 near the inner opening 32 of each of the conduit collars 26 and 28. The stop means 44 is formed by an outer end portion of each of the conduit collars which includes a neck defining the outer end openings 34 wherein the openings 34 have diameters less than the outside diameters of the end collars 18 and 20. The end collars 18 and 20 containing the rings 36 and 40 are thus slidably rotatable around the cylindrical surfaces 38 and are slidably movable between the stop means 42 and 44. The inside diameters of the retaining rings 42 should be substantially greater than the outside diameter of the body member 12 so that the body member 12 will be angularly adjustable relative to the axial centerlines 46a, b of each of the conduit collars 26 and 28. The conduit collars 26 and 28 may be constructed of a metal alloy, such as stainless steel, suitable for permitting the outer ends thereof to be welded to fluid conduits 48 and 50, the latter, of course, being conventional fluid piping which form no part of the present invention other than being illustrative of a use for the coupling 10.

Figure 2:
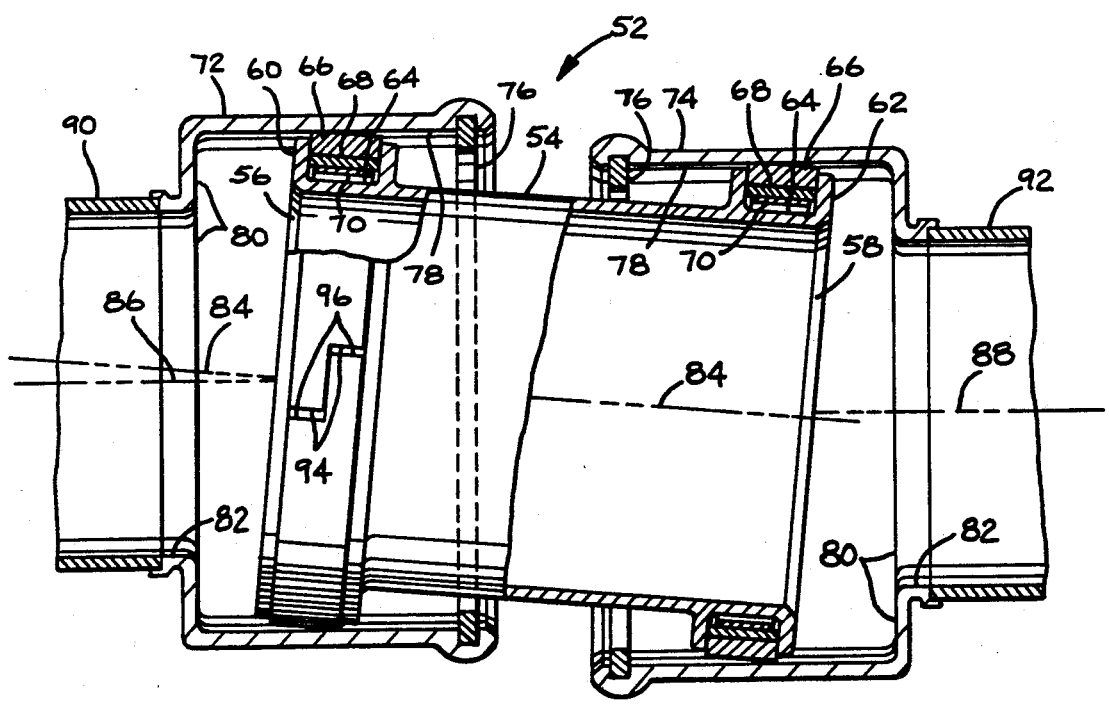
FIG. 2 shows a longitudinal partially cross-sectioned view of a generally cylindrically shaped flexible coupling for transferring a fluid between two attached fluid conduits, thus illustrating another preferred embodiment of our invention.

Referring now to FIG. 2, there is shown, in another preferred embodiment of our invention, a coupling 52 including a hollow cylindrically shaped body member 54 having circular openings 56 and 58 at opposite ends thereof and containing raised cylindrically shaped end collars 60 and 62 defining outwardly opening endlessly extending grooves 64 therein, all being similar in construction to the body member 12 and grooved end collars 18 and 20 of the previous example. However, in this case, the grooves 64 contain a different type of seal ring means including a first split seal ring 66 constructed of a suitable compressible, resilient and relatively durable or relatively nonwearable material such as that sold under the trademark TEFLON, and a second split seal ring 68 constructed of a suitable metal alloy disposed between the first seal ring 66 and biasing means comprising a conventional metal alloy split spring 70.

As in the previous example, the coupling 52 also includes a pair of cylindrically shaped, hollow, open ended metal conduit collars 72 and 74 removably disposed over and around the end collars 60 and 62, respectively. A pair of spaced apart stop means is also included in each of the conduit collars 72 and 74, one of which is a conventional metal alloy split retaining ring 76 removably disposed in a groove formed around an inner end portion of the hollow interior defining surfaces 78 of each of the collars 72 and 74. The other stop means comprises neck portions 80 of the conduit collars 72 and 74 which form the outer ends of the collars 72 and 74 and define outer circular openings 82 whose diameters are less than the outside diameters of the end collars 60 and 62. These stop means are identical in construction and function to the stop means shown and described in the previous example and confine the end collars 60 and 62 within the conduit collars 72 and 74, respectively. As in the previous example, the end collars 60 and 62 are slidable rotatably around the interior defining surfaces 78 of the conduit collars 72 and 74 and are slidably movable to the right and left as viewed between the stop means 76 and 80. Also, a longitudinal centerline 84 of the body member 54 is angularly adjustable relative to axial centerlines 86 and 88 of the conduit collars 72 and 74, respectively. The neck portions 80 of the metal conduit collars 72 and 74 are secured in a fluid tight manner to conventional metal fluid conduits 90 and 92 as, for example, by welding.

Because the TEFLON seal rings 66 of the present example are split as indicated by opposing ends 94 and 96 of a lap joint shown on one of the rings 66 in FIG. 2, the rings 66 are considerably more expandable than the seal rings 36 of the previous example, whereby the split seal rings 66 of this example can be used in a somewhat higher temperature environment. However, since the seal rings 66 are split, a potential fluid leakage path exists between the split ends 94 and 96 requiring a second split seal ring 68 located inwardly thereof. When the seal rings 66 are assembled, it is recommended that the split ends 94 and 96 of each ring 66 be rotationally displaced a full 180 degrees from the split ends of the correspondng second seal ring 68 in each of the grooves 64.

Figure 3:
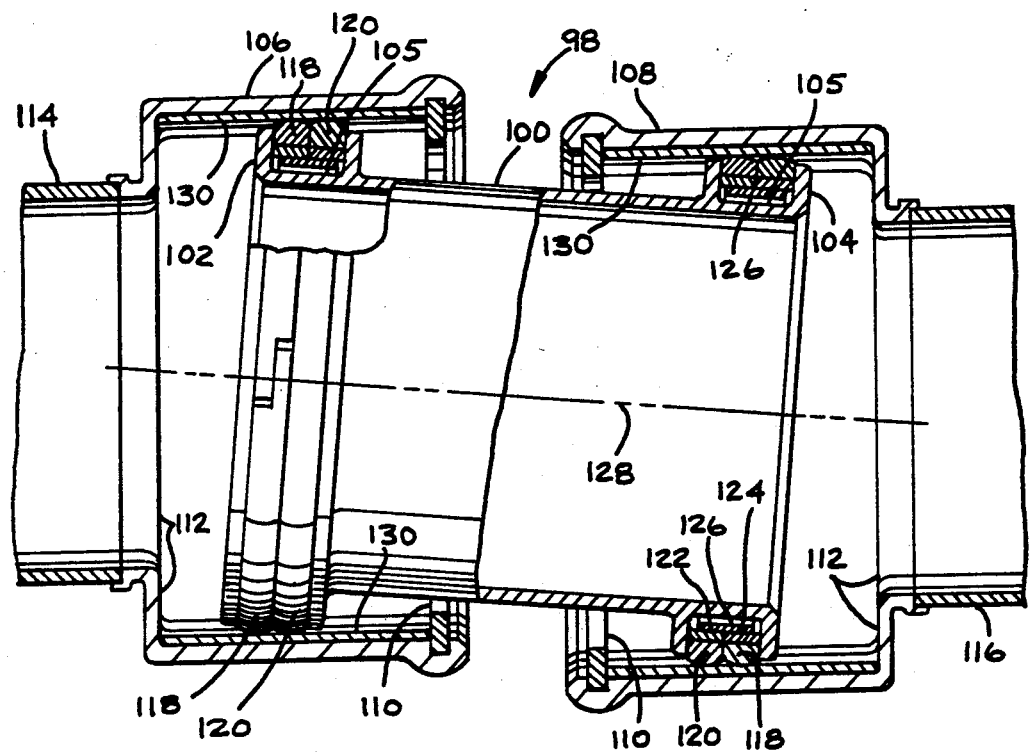
FIG. 3 shows a longitudinal partially cross-sectioned view of a generally cylindrically shaped flexible coupling for transferring a fluid between two attached fluid conduits, thus illustrating yet another preferred embodiment of our invention.

Referring now to FIG. 3, there is shown in another preferred embodiment of our invention, a flexible coupling 98 containing a body member 100, end collars 102 and 104, each defining an endless groove 105, conduit collars 106 and 108 and stop means 110 and 112 in each of the conduit collars, all of the same contruction as shown in the two previous examples. The stop means 112, being in the form of neck portions defining outer ends of the conduit collars 106 and 108, are weldable to conventional fluid conduits 114 and 116. In this example, however, seal ring means is employed which includes a pair of split seal rings 118 and 120 constructed of a suitable metal alloy such as, for example, Inconel metal, disposed adjacent one another in each of the end collar grooves 105. A second pair of split seal rings 122 and 124 constructed of a suitable metal alloy such as either Inconel or stainless steel are disposed adjacent one another in each of the grooves 105 under the adjacent seal rings 118 and 120. A conventional metal alloy spring 126 is disposed in each of the grooves 105 under the rings 122 and 124 to bias the rings 118, 120 outwardly.

Each of the seal rings 118 and 120 have crowned outwardly facing surfaces which extend out of the grooves 105 meaning that such surfaces are convex as viewed in cross-section in a plane containing a longitudinal centerline 128 of the body member 100. But because the metal alloy of which the seal rings 118 and 120 are constructed can be quite hard, it may be necessary to provide a similarly hardened surface on the interior of the conduit collars 106 and 108 for the crown surfaces to bear against. In so doing, however, it is necessary that the outer end neck portions 112 of each of the conduit collars be weldable to fluid conduits 114 and 116. For this reason, there is provided a pair of cylinders 130 of stainless steel or other suitable metal alloy, which are hardened sufficiently to provide suitably durable surfaces against which the seal rings 118 and 120 can bear, which cylinders 130 are pressed into tight fitting relation with the interior wall of the conduit collars 106 and 108. Thus, a durable and suitably hard hollow interior defining surface is formed by the cylinders 130 against which the seal rings 118 and 120 can bear. The remainder of the conduit collars 106 and 108 are constructed of a suitable metal alloy such as Inconel such that the neck portions 112 thereof are readily weldable to conventional metal fluid conduits 114 and 116 in the usual, well known manner.

When the seal rings 118 and 120 or either of them become worn to such an extent that fluid leakage begins to occur between the end collars 102 and 104 and the hollow interior defining surfaces 130, the rings 118 and 120 can readily be removed and replaced without the necessity of discarding the entire coupling 98 by first removing the retaining rings 110 and then sliding the end collars 102 and 104 out through the inner end openings of their respective conduit collars 106 and 108. The seal rings of the two previous examples may also be removed and replaced in the same manner, whereby the useful life of the remaining components of the coupling of our invention can be greatly extended over that possible using prior art flexible couplings.

Figure 4:
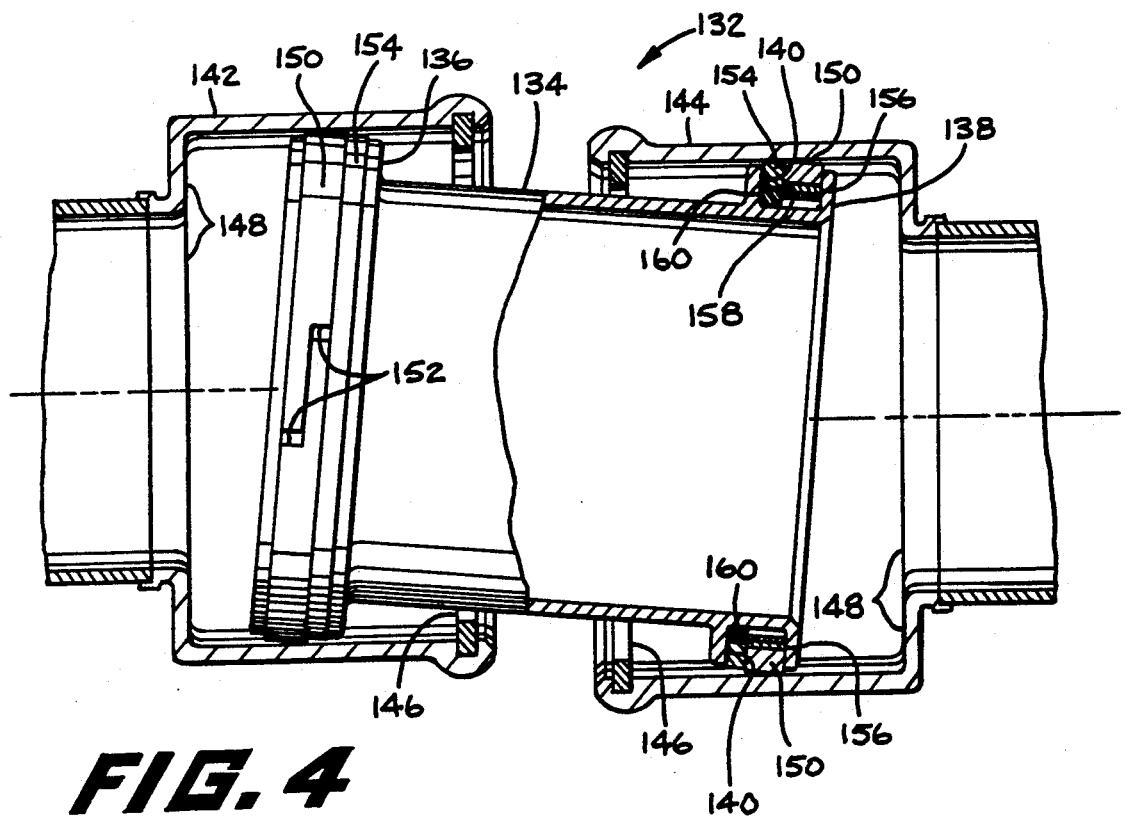
FIG. 4 shows a longitudinal partially corss-sectioned view of a generally cylindrically shaped flexible coupling for transferring a fluid between two attached fluid conduits, thus illustrating still another preferred embodiment of our invention.

Referring now to FIG. 4, there is shown in another preferred embodiment of our invention a flexible coupling 132 including a body member 134 containing a pair of end collars 136 and 138, which collars each define a groove 140, a pair of conduit collars 142 and 144 surrounding different ones of the end collars 136 and 138, and stop means including split rings 146 and neck portions 148, all identical in construction and function to the corresponding elements of the previous examples.

Within each of the grooves 140 is disposed a first split seal ring 150 having a lap joint 152 and being constructed of a TFE material such as that sold under the TEFLON brand, and an adjacently disposed endless seal ring 154 also constructed of TFE material. As in the case of the rings of previous examples, the rings 150 and 154 of the present example contain outwardly facing surfaces which bear against the hollow interior defining surfaces of their corresponding conduit collars 142 and 144. In this example, the rings 150 and 154 are uncrowned. Inwardly of the split TFE seal ring 150, is a metal split seal ring 156 and inwardly of the ring 156 is a metal biasing spring 158. Inwardly of the endless TFE seal ring 154 is an endless, compressible resilient biasing ring 160 of a type similar to the biasing ring 40 of FIG. 1 which may likewise be constructed of a material such as that sold under the trademark VITON. We have found that this ring arrangement provides an effective fluid seal when operating at temperatures of up to about 500 degrees F.

In practice, the endless ring 154 provides an effective seal at high temperatures up to about 500 degrees F. and the split TFE seal ring 150 and split metal seal ring 156, in combination, provide the most effective seal at any temperature below the maximum temperature to which the endless ring 154 was previously exposed.

While the examples of our invention as shown herein all employ body members having end collars located on opposite ends thereof which fit with two separate conduit collars, it will be appreciated that only one end collar on a body member disposed in a single conduit collar between stop means and containing replaceable seal ring means and biasing means is likewise within the scope of our invention. In the latter case, the body member itself can be an end portion of a fluid conduit containing a grooved end collar around an end portion thereof. Or in the alternative, a separate body member can be provided containing a grooved end collar on one end thereof confined between stop means in a conduit collar while the other end of the body member is welded or otherwise rigidly connected in a suitable manner to a fluid conduit.

Although the present invention has been described and shown with respect to specific details of certain preferred embodiments thereof, it is not intended that such details limit the scope and coverage of this patent other than as specifically set forth in the following claims.

I claim:

1. An improved flexible coupling for transferring a fluid, under pressure, from a first to a second fluid conduit comprising a hollow body member open on opposite ends thereof, a first cylindrical shaped end collar rigidly secured to said member around at least one of said open ends, said first end collar defining an outwardly opening groove which extends endlessly around a peripheral surface portion thereof, a first conduit collar defining a hollow cylindrically shaped interior open on opposite ends thereof, said first conduit collar being disposed over and around said first end collar, first seal ring means removably disposed in said groove and extending radially outward therefrom for providing an effective fluid seal between said first end collar and the hollow interior defining surface of said first conduit collar, a first pair of spaced stop means attached to opposite end portions of the hollow interior defining surface of said first conduit collar for confining said first end collar therebetween, and first biasing means disposed in said groove inwardly of said seal ring means for urging said seal ring means outwardly against the hollow interior defining surface of said first conduit collar, said first end collar being slidably rotatable in said first conduit collar and slidably movable between said pair of stop means, said body member being angularly adjustable relative to a centerline of said conduit collar, said first seal ring means comprising a first pair of relatively non-wearable metal alloy split seal rings disposed beside one another, each of said first pair of seal rings having a crowned outwardly facing surface extending out of said groove, and a second pair of metal alloy split seal rings disposed beside one another between said first pair of seal rings and said first biasing means.

2. The flexible coupling of claim 1 wherein said first end collar is integrally formed on said body member.

3. The flexible coupling of claim 1 wherein said first end collar comprises a raised surface portion of said body member.

4. The flexible coupling of claim 1 wherein said body member is cylindrically shaped.

5. The flexible coupling of claim 1 wherein said first conduit collar is cylindrically shaped.

6. The flexible coupling of claim 1 wherein at least one of said first pair of stop means is removably attached to the hollow interior defining surface of said first conduit collar.

7. The flexible coupling of claim 1 wherein said first conduit collar is removably disposed over and around said first end collar.

8. The flexible coupling of claim 1 wherein said pair of stop means comprises a split retaining ring removably disposed in a groove formed in and around an inner open end portion of the hollow interior defining surface of said first conduit collar, and a cylindrically shaped neck formed on an outer end of said first conduit collar and defining an outer end opening having a diameter less than the outside diameter of said first end collar for preventing said first end collar from passing through said outer end opening.

9. The flexible coupling of claim 1 wherein said first biasing means comprises a split spring.

10. The flexible coupling of claim 1 wherein said first conduit collar is cylindrically shaped, an outer end portion thereof including a neck defining a circular opening whose diameter is less than the outside diameter of said first end collar for preventing said first end collar from passing through said outer end opening.

11. The flexible coupling of claim 1 further comprising a hollow, cylindrically shaped hardened steel collar disposed in tight fitting relation with the hollow interior defining surface of said first conduit collar and extending between said first pair of stop means, said first pair of split seal rings normally bearing upon said hardened steel collar.

12. The flexible coupling of claim 1 wherein said first biasing means comprises a split spring.

13. The flexible coupling of claim 1 wherein said first pair of stop means comprises a split retaining ring removably disposed in a groove formed in and around an inner open end portion of the hollow interior defining surface of said first conduit collar, and a cylindrically shaped neck formed on an outer end of said first conduit collar and defining an outer end opening having a diameter less than the outside diameter of said first end collar for preventing said first end collar from passing through said outer end opening.

14. The flexible coupling of claim 1 wherein said first end collar is integrally formed on said body member.

15. The flexible coupling of claim 1 wherein said first conduit collar is cylindrically shaped.

16. The flexible coupling of claim 13 wherein said neck defined an annularly extending shoulder around said outer open end for receiving an end of a fluid conduit flush thereagainst, said neck being weldable to said fluid conduit.

17. The flexible coupling of claim 8 wherein said neck defines an annularly extending shoulder around said outer open end for receiving an end of a fluid conduit flush thereagainst, said neck being weldable to said fluid conduit.

18. The flexible coupling of claim 10 wherein said neck defines an annularly extending shoulder around said outer open end for receiving an end of a fluid conduit flush thereagainst, said neck being weldable to said fluid conduit.

19. An improved flexible coupling for transferring a fluid, under pressure, from a first to a second fluid conduit comprising a hollow body member open on opposite ends thereof, a first cylindrical shaped end collar rigidly secured to said member around at least one of said open ends, said first end collar defining an outwardly opening groove which extends endlessly around a peripheral surface portion thereof, a first conduit collar defining a hollow cylindrically shaped interior open on opposite ends thereof, said first conduit collar being disposed over and around said first end collar.

first seal ring means removably disposed in said groove and extending radially outward therefrom for providing an effective fluid seal between said first end collar and the hollow interior defining surface of said first conduit collar, said first seal ring means comprising a first split seal ring constructed of a compressible, resilient, relatively non-wearable material, an endless seal ring constructed of a compressible, resilient, relatively non-wearable material, said endless seal ring being disposed adjacent said first split seal ring, and a second split metal seal ring disposed inwardly of said first split seal ring, a first pair of spaced stop means attached to opposite end portions of the hollow interior defining surface of said first conduit collar for confining said first end collar therebetween, said first end collar being slidably rotatable in said first conduit collar and slidably movable between said pair of stop means, said body member being angularly adjustable relative to a centerline of said conduit collar, first biasing means disposed in said groove inwardly of said seal ring means for urging said seal ring means outwardly against the hollow interior defining surface of said first conduit collar, said first biasing means comprising a split metal spring disposed inwardly of said second split metal seal ring, for urging said second split metal seal ring and said first split seal ring outwardly, and an endless ring of compressible, resilient material disposed inwardly of said endless seal ring and being in a state of compression for urging said endless seal ring outwardly.

20. The flexible coupling of claim 19 wherein the relatively non-wearable material from which said first split seal ring and said endless seal ring are constructed comprises TFE material.

21. The flexible coupling a claim 19 wherein said first split seal ring includes a lap joint.

22. An improved flexible coupling for transferring a fluid, under pressure, from a first to a second fluid conduit comprising a hollow body member open on opposite end thereof, first and second cylindrically shaped end collars rigidly secured to said member around opposite open ends thereof, each of said end collars defining an outwardly opening groove which extends endlessly around a peripheral surface portion thereof, first and second conduit collars, each of said conduit collars being attachable to a fluid conduit and defining a hollow cylindrically shaped interior open on opposite end thereof, each of said conduit collars being disposed over and around a different one of said end collars, first and second seal ring means disposed respectively in the grooves defined by said first and second end collars and extending radially outward from said grooves for providing an effective fluid seal between said first and second end collars and the hollow interior defining surface of their corresponding conduit collars, first and second pairs of stop means, each of said stop means pairs being attached to opposite end portions of the hollow interior defining surfaces of a different one of said conduit collars for confining said end collars in different ones of said conduit collars, and first and second biasing means disposed in said grooves inwardly of said first and second seal ring means, respectively, for urging each of said seal ring means outwardly against the hollow interior defining surface of a corresponding one of said conduit collars, said end collars being slidably rotatable in their respective conduit collars and slidably movable between their respective stop means, said body member being angularly adjustable relative to a centerline of both of said conduit collars each of said first and second seal ring means comprising a first pair of relatively non-wearable metal alloy split seal rings disposed beside one another, each of said first pair of seal rings having a crowned outwardly facing surface extending out of said groove, and a second pair of metal alloy split seal rings disposed beside one another between said first pair of seal rings and one of said biasing means.

23. The flexible coupling of claim 22 further comprising first and second hollow, cylindrically shaped hardened steel collars, each of said hardened steel collars being disposed in tight fitting relation with the hollow, interior defining surface of a correspondingly numbered one of said first and second conduit collars and extending between correspondingly numbered one of said first and second stop means pairs, said first pair of split seal rings normally bearing upon said hardened steel collars.

24. An improved flexible coupling for transferring a fluid, under pressure, from a first to a second fluid conduit comprising a hollow body member open on opposite end thereof, first and second cylindrically shaped end collars rigidly secured to said member around opposite open ends thereof, each of said end collars defining an outwardly opening groove which extends endlessly around a peripheral surface portion thereof, first and second conduit collars, each of said conduit collars being attachable to a fluid conduit and defining a hollow cylindrically shaped interior open on opposite end thereof, each of said conduit collars being disposed over and around a different one of said end collars, first and second seal ring means disposed respectively in the grooves defined by said first and second end collars and extending radially outward from said grooves for providing an effective fluid seal between said first and second end collars and the hollow interior defining surface of their corresponding conduit collars, each of said first and second seal ring means comprising a first split seal ring constructed of a compressible resilient, relatively non-wearable material, an endless seal ring constructed of a compressible, resilient, relatively nonwearable material, said endless seal ring being disposed adjacent said first split seal ring, and a second split metal seal ring disposed inwardly of said first split seal ring, first and second pairs of stop means, each of said stop means pairs being attached to opposite end portions of the hollow interior defining surfaces of a different one of said conduit collars for confining said end collars in different ones of said conduit collars, and first and second biasing means disposed in said grooves inwardly of said first and second seal ring means, respectively, for urging each of said seal ring means outwardly against the hollow interior defining surface of a corresponding one of said conduit collars, said end collars being slidably rotatable in their respective conduit collars and slidably movable between their respective stop means, said body member being angularly adjustable relative to a centerline of both of said conduit collars each of said biasing means comprising a split metal spring disposed inwardly of said second split metal seal ring, for urging said second split metal seal ring and said first split seal ring outwardly, and an endless ring of compressible, resilient material disposed inwardly of said endless seal ring and being in a state of compression for urging said endless seal ring outwardly.

25. An improved flexible coupling for transferring a fluid, under pressure, from a first to a second fluid conduit comprising a hollow body member open on opposite ends thereof, end collar means rigidly secured to said member around at least one of said open ends, said end collar means defining an outwardly opening groove which extends endlessly around a peripheral surface portion thereof, conduit collar means for attachment to a first and second fluid conduit and defining a hollow cylindrically shaped interior open on opposite ends thereof, said conduit collar means being disposed over and around said end collar means, seal ring means removably disposed in said groove and extending radially outward therefrom for providing an effective fluid seal between said end collar means and the hollow interior defining surface of said conduit collar means, stop means attached to said conduit collar means for confining said end collar means in the hollow interior of said conduit collar means, and first biasing means disposed in said groove inwardly of said seal ring means for urging said seal ring means outwardly against the hollow interior defining surface of said conduit collar means, said end collar means being slidably rotatable in said conduit collar means and slidably movable between the opposite open ends of said conduit collar means, said body member being angularly adjustable relative to a centerline of said conduit collar means, said seal ring means comprising a first pair of relatively non-wearable metal alloy split seal rings disposed beside one another, each of said first pair of seal rings having a crowned outwardly facing surface extending out of said groove, and a second pair of metal alloy split seal rings disposed beside one another between said first pair of seal rings and said first biasing means.

26. The flexible coupling of claim 25 further comprising a hollow, cylindrically shaped hardened steel collar disposed in tight fitting relation with the hollow interior defining surface of said conduit collar means and extending between said stop means, said first pair of split seal rings normally bearing upon said hardened steel collar.

27. An improved flexible coupling for transferring a fluid, under pressure, from a first to a second fluid conduit comprising a hollow body member open on opposite ends thereof, end collar means rigidly secured to said member around at least one of said open ends, said end collar means defining an outwardly opening groove which extends endlessly around a peripheral surface portion thereof, conduit collar means for attachment to a first and second fluid conduit and defining a hollow cylindrically shaped interior open on opposite ends thereof, said conduit collar means being disposed over and around said end collar means, seal rings means removably disposed in said groove and extending radially outward therefrom for providing an effective fluid seal between said end collar means and the hollow interior defining surface of said conduit collar means, stop means attached to said conduit collar means for confining said end collar means in the hollow interior of said conduit collar means, and first biasing means disposed in said groove inwardly of said seal ring means for urging said seal ring means outwardly against the hollow interior defining surface of said conduit collar means, said end collar means being slidably rotatable in said conduit collar means and slidably movable between the opposite open ends of said conduit collar means, said body member being angularly adjustable relative to a centerline of said conduit collar means, said seal ring means comprising a first split seal ring constructed of a compressible, resilient, relatively non-wearable material, an endless seal ring constructed of a compressible, resilient, relatively non-wearable material, said endless seal ring being disposed adjacent said first split seal ring, and a second split metal seal ring disposed inwardly of said first split seal ring, said first biasing means comprising a split metal spring disposed inwardly of said second split metal seal ring, for urging said second split metal seal ring and said first split seal ring outwardly, and an endless ring of compressible, resilient material disposed inwardly of said endless seal ring and being in a state of compression for urging said endless seal ring outwardly.

28. The flexible coupling of claim 19 wherein said first end collar is integrally formed on said body member.

29. The flexible coupling of claim 19 wherein said first end collar comprises a raised surface portion of said body member.

30. The flexible coupling of claim 19 wherein said body member is cylindrically shaped.

31. The flexible coupling of claim 19 wherein said first conduit collar is cylindrically shaped.

32. The flexible coupling of claim 19 wherein at least one of said first pair of stop means is removably attached to the hollow interior defining surface of said first conduit collar.

33. The flexible coupling of claim 19 wherein said first conduit collar is removably disposed over and around said first end collar.

34. The flexible coupling of claim 19 wherein said pair of stop means comprises a split retaining ring removably disposed in a groove formed in and around an inner open end portion of the hollow interior defining surface of said first conduit collar, and a cylindrically shaped neck formed on an outer end of said first conduit collar and defining an outer end opening having a diameter less than the outside diameter of said first end collar for preventing said first end collar from passing through said outer end opening.

35. The flexible coupling of claim 19 wherein said first conduit collar is cylindrically shaped, an outer end portion thereof including a neck defining a circular opening whose diameter is less than the outside diameter of said first end collar for preventing said first end collar from passing through said outer end opening.

* * * * *